UNITED STATES PATENT OFFICE.

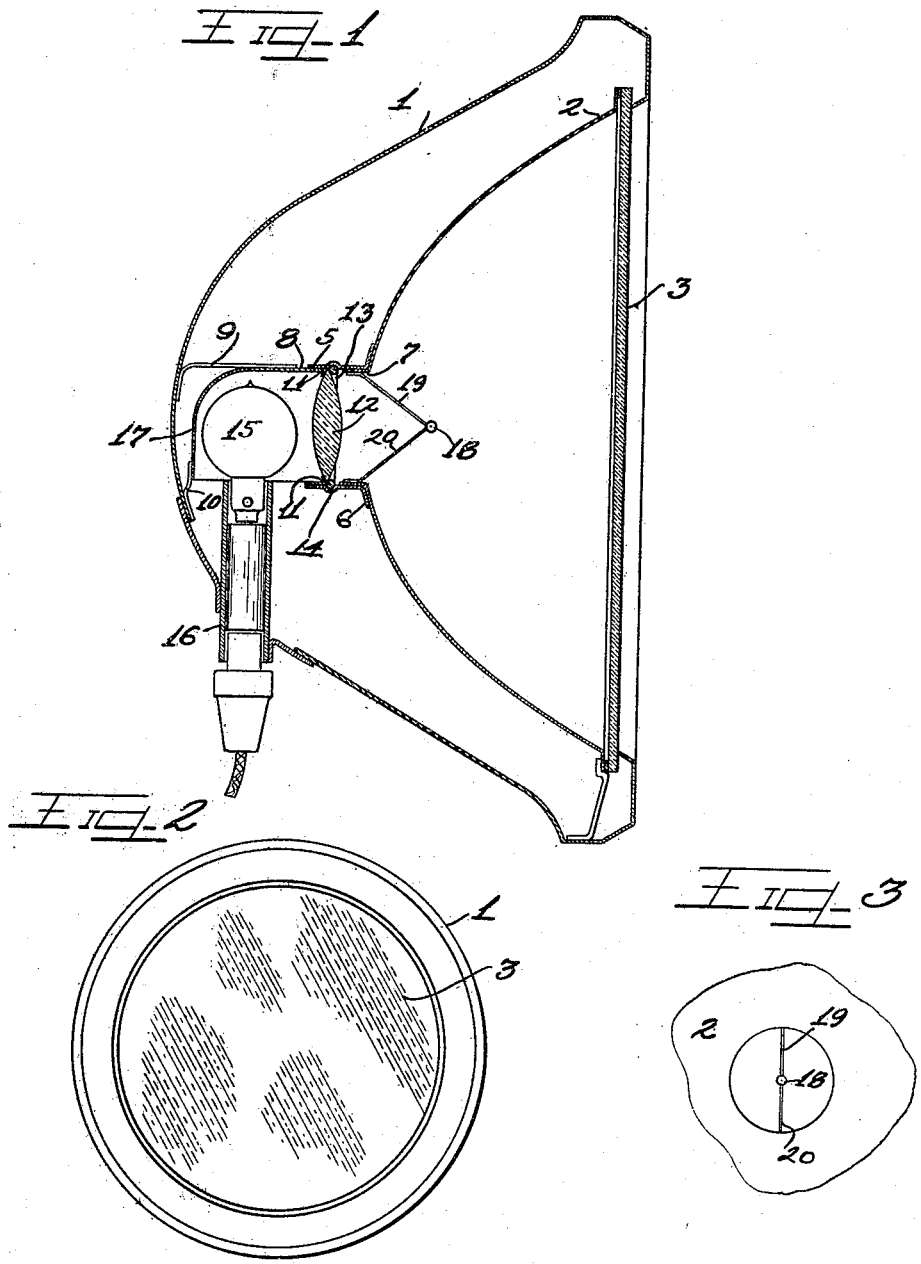

JOHN WHYTE, OF CHICAGO, ILLINOIS, ASSIGNOR TO WARNER-PATTERSON COMPANY, A CORPORATION OF ILLINOIS.

HEADLIGHT.

1,427,505.   Specification of Letters Patent.   Patented Aug. 29, 1922.

Application filed July 20, 1921. Serial No. 486,125.

*To all whom it may concern:*

Be it known that I, JOHN WHYTE, a citizen of the United States, and a resident of the city of Chicago, in the county of Cook and State of Illinois, have invented certain new and useful Improvements in a Headlight; and I do hereby declare that the following is a full, clear, and exact description of the same, reference being had to the accompanying drawings, and to the numerals of reference marked thereon, which form a part of this specification.

This invention relates to headlights of the sort which use a parabolic reflector.

It is an object of this invention to provide a source of light which may be compact so as to reproduce almost exactly the point source which the theory of the parabolic reflector requires.

It is a further object of this invention to support such a source at the focus of the parabolic mirror.

It is a further object of this invention to use for a source of light a small body placed at the focus of the parabolic mirror and illuminated from a lamp outside of the mirror.

It is a further object of this invention to make use of the optical properties of a small sphere to substantially reproduce the characteristics of a point source of light.

Other and further important objects of this invention will be apparent from the disclosures in the specification and the accompanying drawings.

The invention (in a preferred form) is shown on the drawings and hereinafter more fully described.

On the drawings:

Figure 1 is a vertical section of the headlight.

Figure 2 is a front view of the same.

Figure 3 is a detail showing the method of mounting the source.

As shown on the drawings:

The headlight is provided with the usual casing 1 in which there is supported by any usual or feasible means a parabolic mirror 2 and a front glass 3. At the rear of the parabolic mirror there is a circular opening surrounded by a tubular housing 5 which is secured to the mirror by means of a flange 6 upon the housing. The material of the mirror is continued into this housing in the shape of a tube 7.

Behind the tube 7 is a tubular casing 8, the forward end of which is contained within the housing 5. The rear end of the tube 8 is supported from the casing 1 by means of two straps 9 and 10 or by any other suitable arrangement. The forward end of the tube 8 is provided with an inturned flange 11 which serves as the rear member for the fastening of a lens 12. The forward member of this fastening consists of a ring 13. To secure this ring in place the tubular housing 5 is provided with an outstanding groove 14. Behind the lens 12 is a lamp 15 supported by any standard or convenient lamp fixture 16 which leads to the outside of the casing. The lamp 15 and the lens 12 are so positioned that the light from the lens will be brought to a focus at the focus of the parabolic mirror. The rear end of the housing 8 is closed by a wall 17 of reflecting material. Preferably the housing 8 and the tube 7 are also of reflecting material.

A small sphere 18 is supported at the focus of the parabolic mirror. This sphere is of highly reflecting material, preferably silver. It is supported in any suitable manner. In the form of the invention illustrated the support is afforded by two straps 19 and 20 secured at one end to this sphere and at the other end to the inner surface of the tube.

In the operation of this device, the lamp 15 and the sphere 18 being at conjugate foci of the lens 12, an image of the lamp 15 will be formed at the point 18. The mirror which the surface of the sphere 18 affords has its virtual focus behind the center of the sphere, but as the mirror is very small the focus may be regarded as substantially at the center. If very great accuracy is desired the sphere may be so located that the virtual focus corresponding to the image formed by the lamp and lens is at the focus of the parabolic mirror.

The rays of light, therefore, leave the mirror 18 in the same way as if they departed from a mere point which is exactly at the focus of the parabolic mirror 2. Consequently they are reflected from the parabolic mirror exactly as if they issued from a point source at the focus.

I am aware that numerous details of construction may be varied through a wide range without departing from the principles of this invention, and I therefore do not purpose limiting the patent granted otherwise than necessitated by the appended claims.

I claim as my invention:

1. In combination, a parabolic mirror and an optical system including a small spherical mirror, the virtual focus of said spherical mirror being at the focus of the parabolic mirror.

2. In combination, a lamp, a lens for bringing the light from said lamp to a focus, a small complete spherical mirror at said focus, and a parabolic mirror whose focus is at said spherical mirror.

3. A parabolic mirror, a complete spherical mirror, and means for supporting said spherical mirror near the focus of said parabolic mirror.

4. A parabolic mirror, a small reflecting sphere at the focus of said mirror, and supports extending from said sphere to said parabolic mirror.

5. A parabolic mirror, an aperture in the center thereof, a source of light behind said aperture, a lens between said source and said aperture, and a reflecting sphere in front of said aperture at the focus of said mirror.

6. A parabolic mirror, an aperture in the center thereof, a source of light behind said aperture, a lens between said source and said aperture, a reflecting sphere in front of said aperture at the focus of said mirror, and supports for said sphere extending from the sides of said aperture.

In testimony whereof I have hereunto subscribed my name in the presence of two subscribing witnesses.

JOHN WHYTE.

Witnesses:
 CARLTON HILL,
 JAMES M. O'BRIEN.